March 30, 1926.                                                1,578,560
                     F. W. SPERR, JR
            PROCESS AND APPARATUS FOR ELIMINATING THE
              SULPHURETED HYDROGEN IN FUEL GAS
                   Filed June 6, 1924        3 Sheets-Sheet 1
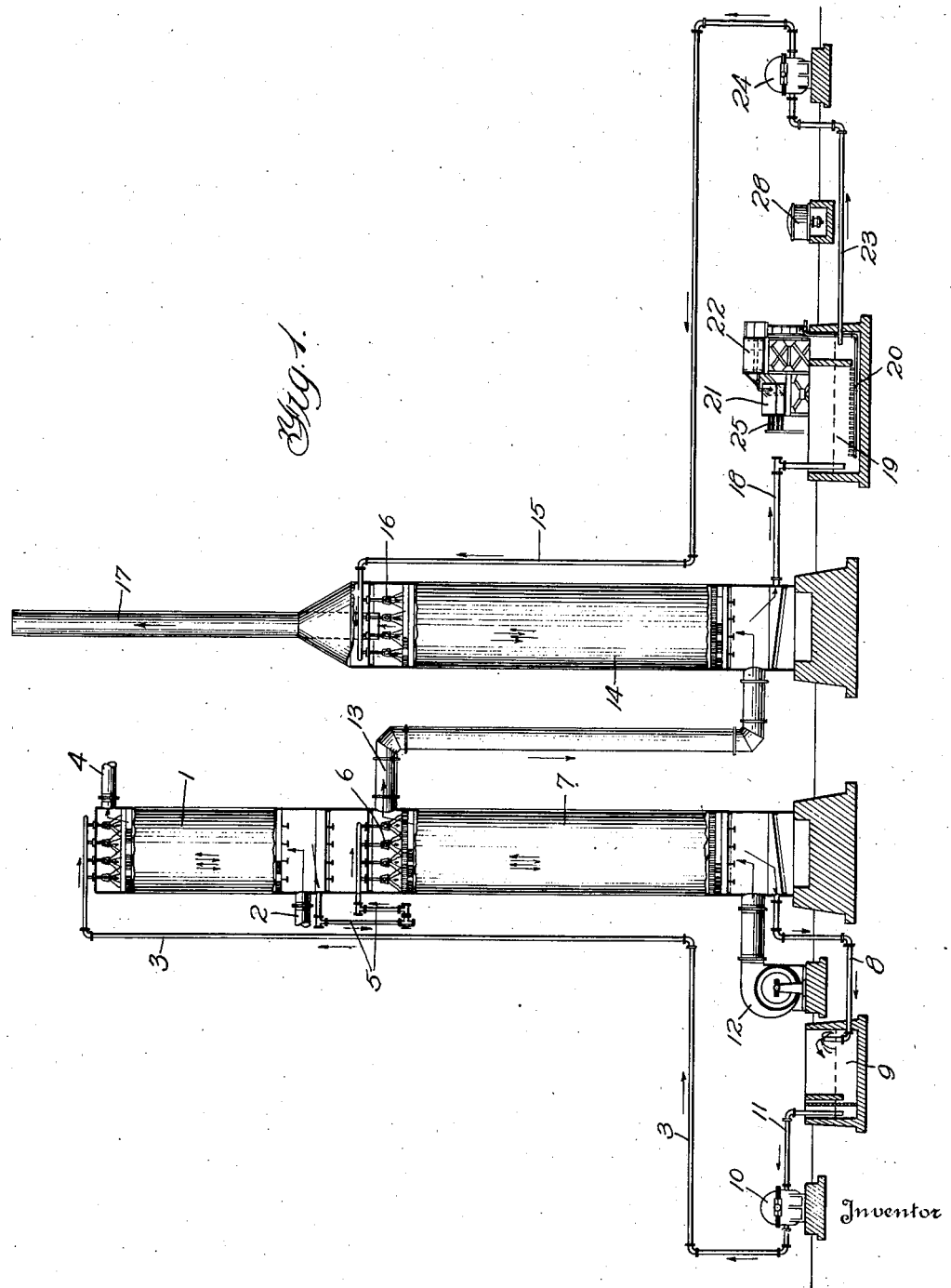

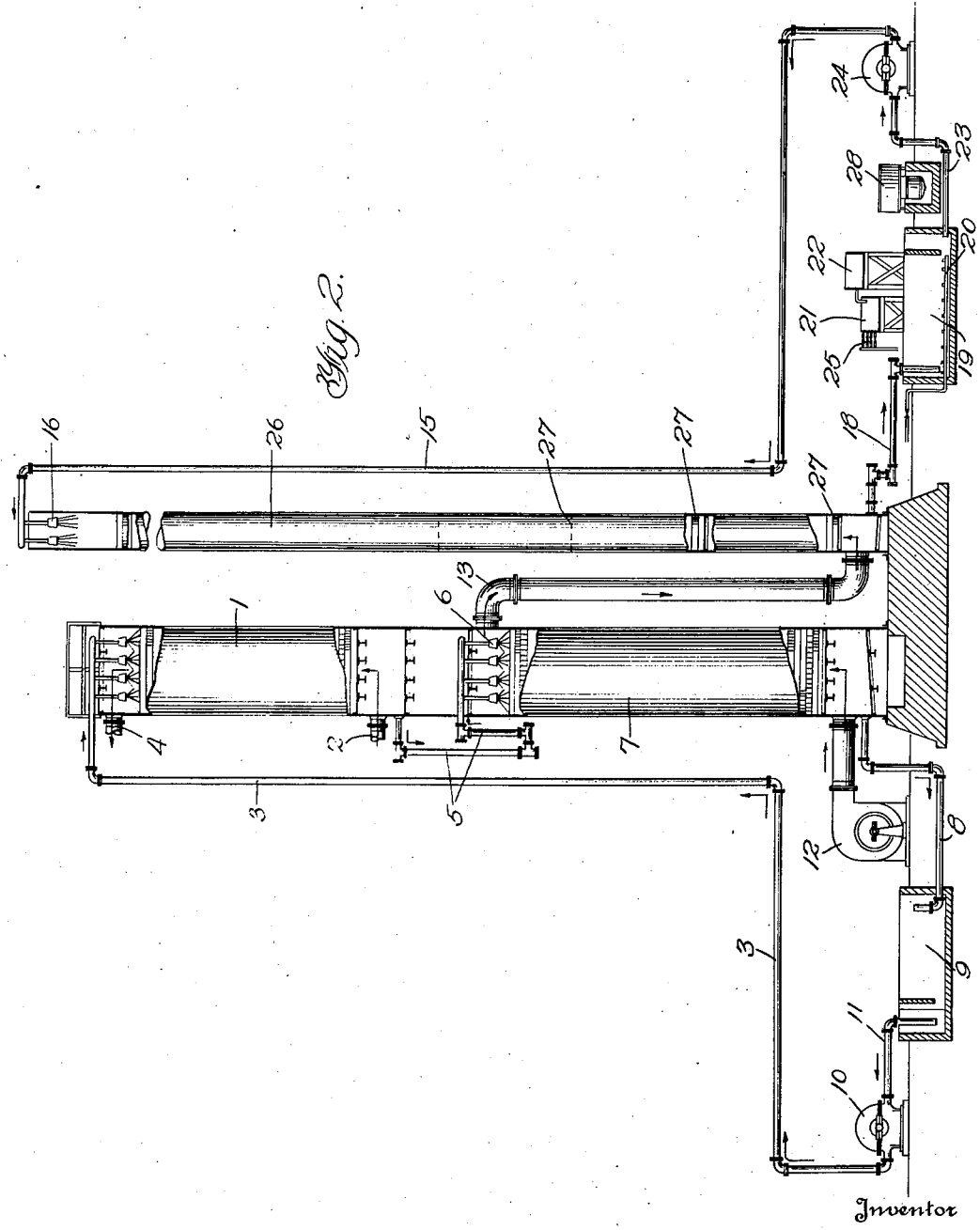

March 30, 1926. 1,578,560
F. W. SPERR, JR
PROCESS AND APPARATUS FOR ELIMINATING THE
SULPHURETED HYDROGEN IN FUEL GAS
Filed June 6, 1924   3 Sheets-Sheet 3
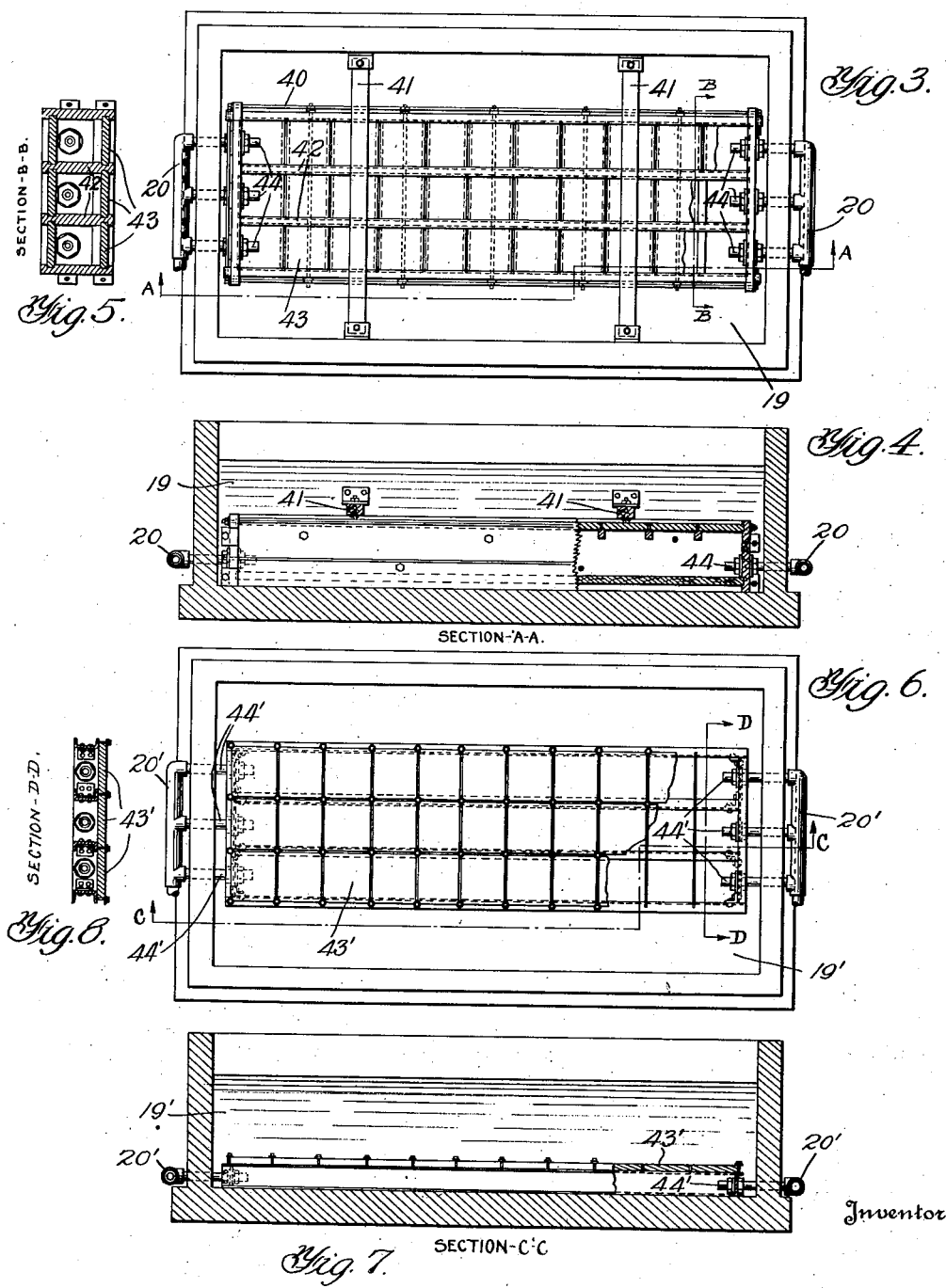

Patented Mar. 30, 1926.

1,578,560

UNITED STATES PATENT OFFICE.

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA.

PROCESS AND APPARATUS FOR ELIMINATING THE SULPHURETED HYDROGEN IN FUEL GAS.

Application filed June 6, 1924. Serial No. 718,253.

*To all whom it may concern:*

Be it known that I, FREDERICK W. SPERR, Jr., a citizen of the United States, residing in Pittsburgh, in the county of Allegheny and State of Pennsylvania, have invented a new and useful Improvement in Processes and Apparatus for Eliminating the Sulphureted Hydrogen in Fuel Gas, of which the following is a specification.

This invention relates to processes and apparatus for the elimination of hydrogen sulphide from coal and like fuel gases, and particularly to the kind of purification described in U. S. Patents Nos. 1,390,037, Jacobson, and 1,389,980, Ramsburg, granted to The Koppers Company, wherein the gas is washed with a liquid (for example sodium carbonate solution) capable of absorbing the hydrogen sulphide, and the wash liquid regenerated by aeration.

In the said prior process the hydrogen sulphide and other acid impurities are transferred from the gas to the air and in some instances it is not permissible to discharge the air containing these impurities, into the atmosphere, hence the present inventor has heretofore provided for treating the air in order to remove the sulphur therefrom, chiefly by washing said air with a liquid containing an iron compound with which the sulphur can combine to form iron sulphide, as set forth in my copending application Ser. No. 521,913, filed December 12, 1921. From the purely chemical standpoint the removal of the sulphur from the air offers but little difficulty but from the industrial and commercial standpoint the removal cheaply and effectively of the small traces of hydrogen sulphide from the large volume of air employed in the aeration operation is a very difficult problem. The primary object of the present invention is to provide a solution of this problem.

The present inventor has found, however, that the natural iron oxide and artificial iron compounds he has previously employed for washing the air are relatively less active than is desirable, and even the precipitated material prepared and stored for some time loses some of its effectiveness; and the invention therefore consists broadly in washing the air after it has acted in the regeneration stage, with a liquid containing a freshly precipitated iron compound, to eliminate the hydrogen sulphide from said air, and in respect of such broad feature the present application is a continuation in part of applicant's aforesaid copending application Ser. No. 521,913, filed December 12, 1921.

The freshly precipitated iron compound may be formed as a step in the cycle of operations of the process although in some instances it is preferable, as will be seen hereinafter, to form the freshly precipitated compound outside of the main process and add it to the air washing liquid.

The invention also consists in providing apparatus for carrying out the process which comprises novel features as hereinafter pointed out.

The invention further consists in such other new and useful improvements, and has for further objects such other operative advantages or results, as may be found to obtain in the processes and apparatus hereinafter described or claimed.

In order that the invention may be understood, there will now be described by way of example and with reference to the accompanying drawings, a preferred mode of carrying out the process and several arrangements of apparatus with which the process may be carried out.

In these drawings:

Figure 1 is a general elevational view of a complete plant for the elimination of hydrogen sulphide from coal gas.

Figure 2 is a similar view of a modified plant in which the air washing is performed in a stack or chimney.

Figures 3, 4 and 5 are detail views showing in plan, sectional elevation, and partial and sectional elevation respectively, a modified device for the removal of sulphur from the air washing liquid. An alternative structure is shown correspondingly in Figures 6, 7 and 8.

In the several figures of these drawings similar reference numerals refer to corresponding parts.

In the specific instances now to be described, coal gas is purified from hydrogen sulphide and other acid impurities, by washing with a solution of sodium carbonate in a scrubber 1 into which the gas enters at the inlet 2, flows upwardly in countercurrent with the washing solution delivered through a pipe 3, and is discharged at the outlet 4. In the scrubber 1 the hydrogen sulphide is transferred to the solution which flows from the bottom of the scrubber through pipes 5 and a set of sprayers 6 into the top of the actifier 7. The solution falls through the actifier 7 to the bottom thereof and flows off through a pipe 8 into a sump 9 from which it is withdrawn by a pump 10 and pipe 11, and thence recirculated to the top of the absorber. The solution traverses the actifier 7 downwardly in countercurrent with a stream of air supplied by a blower 12, whereby the alkaline solution is regenerated and the hydrogen sulphide transferred to the air. The air leaves the actifier by a pipe 13 and is conveyed to the bottom of another large scrubber or tower 14. In the scrubber 14 the air is washed with a liquid containing an iron compound which is capable of reacting with the hydrogen sulphide with formation of iron sulphide, preferably a dilute solution of sodium carbonate containing the iron compound in suspension, as hereinafter described. The wash liquid is introduced at the top of the tower through a pipe 15 and sprayer 16 and after traversing the scrubber downwardly it flows off through a pipe 18 into a sump 19. Clean air is discharged at 17. The liquid in the sump 19, which has been partly regenerated during its passage through the scrubber, is now completely regenerated by means of air jets 20 which also agitate the liquid and mechanically float the sulphur to the surface thereof from which it is readily removed by skimming. The regenerated liquid is withdrawn through the pipe 23 by the pump 24 and recirculated through the scrubber 14. The sulphur recovered is dried in the centrifuge 28.

According to the present invention apparatus is provided for maintaining a supply of freshly precipitated iron compound in the liquid for washing the air.

The precipitation of the iron compound may be effected either as a step within the complete cycle of the gas purification process or it may be effected outside the said cycle.

The apparatus for forming the freshly precipitated iron compound comprises a feed tank 21, and when the precipitation is effected outside the cycle of operations of the main process, a second feed tank 22 is provided. In the first instance the tank 21 contains a solution of a ferric compound, preferably ferric sulphate although ferric chloride (FeCl$_3$) may be used, which is allowed to flow into the sump 19 to react with the wash liquid therein, which latter it will be understood, contains sodium carbonate. The following reaction occurs:

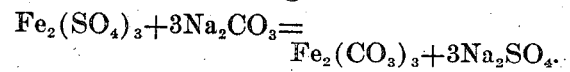

$$Fe_2(SO_4)_3 + 3Na_2CO_3 = Fe_2(CO_3)_3 + 3Na_2SO_4.$$

It is probable that some basic ferric carbonate is also formed.

Ferric carbonate Fe$_2$(CO$_3$)$_3$ is thus precipitated and the washing liquid containing in suspension this freshly formed precipitate reacts with great effectiveness upon the sodium hydrosulphide NaHS formed in the liquid incidentally to the transfer thereto of the hydrogen sulphide from the air in the scrubber. The reaction is as follows:

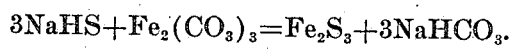

$$3NaHS + Fe_2(CO_3)_3 = Fe_2S_3 + 3NaHCO_3.$$

The iron sulphide Fe$_2$S$_3$ reacts with the air forming iron oxide and sulphur which latter collects in the sump 19 and is recovered as previously described.

Sufficient excess sodium carbonate should be added to, or maintained in, the system so that the additions of ferric sulphate will not destroy the alkalinity of the solution. It is desirable to maintain excess alkalinity equivalent to from 0.5 to 2% Na$_2$CO$_3$, although in certain cases, especially where high efficiency is not especially desired, neutral solutions have been used.

It will be noted that by the above method, considerable sodium sulphate is formed in the system. Where it is desired to avoid this, the invention includes the provision of means whereby precipitation can be accomplished outside the system. In this case, the second feed tank 22 is employed. This contains a solution or suspension of an alkaline compound; for example, sodium hydroxide, sodium carbonate, magnesium oxide, etc. A solution of the ferric compound (e. g. ferric sulphate) is placed in the tank 21 and sufficient of the solution from tank 22 is added to precipitate all of the iron. The precipitate may be allowed to settle to the bottom of the tank 21 and the solution decanted off through manifold connections 25. Water is then added to the tank 21 and the contents agitated and added from time to time to the sump 19 as may be necessary. In this way the bulk of the inert material (e. g. sodium sulphate) is disposed of. Filtration or other means of separating the precipitated material may be employed.

With either method of precipitation it is important to make the additions of the iron compound to the system regularly and systematically. In practice, treating air produced in the purification of gas containing approximately 300 grains H$_2$S per 100 cu. ft., the additions are made every hour putting into the system 0.0075 pound Fe$_2$O$_3$ equivent for each thousand cubic feet of air treated. On a still larger scale, the iron compound would be added continuously.

The gas washing and the regeneration of the solution of sodium carbonate or other wash liquid is preferably carried out in a single tower apparatus as described in The Koppers Company's U. S. Patent No. 1,478,543, Bird.

The air washing may be carried out in an ordinary counterflow scrubber, or in a mechanical scrubber for example of the Feld type, or as shown in Fig. 2, in a stack 26.

There is an advantage in having the final exit air piped off at some distance above the ground and a stack is usually employed in conjunction with these plants. It is a feature of the present invention that this stack or any other available stack can be used as the air scrubber, thus avoiding the expense of providing a separate apparatus. In some cases the stack may be filled with some form of packing, but preferably the greater part of the stack is left empty, a few rows of hurdles 27 being employed at intervals to obtain regular distribution of the solution.

In the modification shown in Figure 3 of the drawings instead of a pipe with a series of jets or nozzles 20, there is used, according to a further feature of the invention, for aerating and agitating the liquid in the sump 19 a device comprising plates of porous ceramic material in contact with the liquid and under which compressed air is forced. Other porous material such as porous earthenware or alundum may be used.

This agitating device, in the form illustrated by way of example, consists of a box 40 resting on the floor of the sump 19 and held therein by cross-bars 41. The box is divided into three longitudinal sections by partitions 42. The top of the box is closed by porous plates 43 of the above mentioned character, and the level of the liquid in the sump is maintained above the plates as indicated. Compressed air is introduced into the box by means of the manifolds 44 and pipes 20 serving all the sections of the box, and the only way of escape of the compressed air is through the pores of the plates 43. A multitude of very minute bubbles is thereby forced upwards through the liquid in the sump. In an alternative form shown in Figures 6, 7 and 8, the partitions are metal channel-beams.

This mode of aeration with finely comminuted air is known as applied to liquids in general, and is claimed herein only in connection with the sulphided liquor regeneration process of the present invention, in which it produces a particularly effective regeneration of the sump liquid and flotation of the sulphur.

The liquid used for washing the air, in any of the modifications of the invention, is preferably an alkaline solution containing an iron compound, although iron compounds in neutral suspensions and also iron compounds in solution can be used. The best results are obtained with the iron compound suspended in a dilute solution containing not over 2% of sodium carbonate.

The freshly precipitated iron compound is usually ferrous or ferric hydroxide, carbonate or basic carbonate. Freshly precipitated iron sulphide may, however, be employed. Ferric compounds are preferable, although ferrous compounds may be used.

The fuel gas to be treated generally contains more or less tarry matter which if washed with a suspension of iron compound becomes mixed with the iron oxide, iron sulphide, sulphur and other materials in suspension and clouds and fouls the washliquor and produces deposits that gum and clog the apparatus. So in the present invention the fuel gas is treated with a clear solution containing no material in suspension, and then the absorbed hydrogen sulphide is removed by aerating the solution with a very large volume of air (usually such volume that the hydrogen sulphide content is not over 200 grains per 100 cu. ft. of the carrier air), and then that air is treated with the wash-liquor containing the freshly precipitated iron compound as before described; and with the great excess of oxygen in such carrier air, and the active freshly formed iron compound in the washliquor, the conditions are highly favorable for the elimination of the hydrogen sulphide and the rapid regeneration of the washliquor, with formation of sulphur, according to the reactions that have been stated.

For the porous plates of the agitator illustrated in Fig. 3 the material known as "Filtros" has proved very satisfactory. This material is a white, rigid, mineral substance composed of carefully selected natural sand averaging 99.6% $SiO_2$, graded by mechanical screens, and bonded by a synthetic silicate bonding agent fusing at temperatures above 2000° F. The "Filtros" plates are porous, not cellular. As before noted, other porous material such as alundum plates may also be used.

The invention as hereinabove set forth or exemplified may be variously practiced or embodied within the scope of the claims hereinafter made.

I claim:

1. A process of the kind referred to for the elimination of hydrogen sulphide from coal gas, characterized by washing the air, after it has acted in the regeneration stage, with a liquid containing a freshly precipitated iron compound, to eliminate the hydrogen sulphide from said air.

2. A process as claimed in claim 1, which the precipitation of the iron compound for use in eliminating hydrogen sulphide from the air is effected as a step within the complete cycle of the gas purification process.

3. A process as claimed in claim 1, in which the precipitation of the iron compound for use in eliminating hydrogen sulphide from the air is effected in immediate cooperation with the gas purification process.

4. A process as claimed in claim 1, in which the freshly precipitated iron compound employed is a ferric compound.

5. A process as claimed in claim 1, in which the precipitation of the iron compound for use in eliminating hydrogen sulphide from the air is effected as a step within the complete cycle of the gas purification process and in which a solution of a ferric compound is added to the liquid employed in the air washing stage, in order to precipitate the hydrogen sulphide eliminating iron compound in said liquid.

6. A process as claimed in claim 1, in which the precipitation of the iron compound for use in eliminating hydrogen sulphide from the air is effected as a step within the complete cycle of the gas purification process and in which a solution of a ferric compound is added to the liquid employed in the air washing stage, in order to precipitate the hydrogen sulphide eliminating iron compound in said liquid and in which an excess of alkali such as sodium carbonate is maintained in or added to the air washing liquid, sufficient to maintain alkalinity of the liquid notwithstanding the additions thereto of the ferric compound.

7. A process as claimed in claim 1, in which the precipitation of the iron compound for use in eliminating hydrogen sulphide from the air is effected in immediate cooperation with the gas purification process and in which a solution of a ferric compound is added to a feed tank containing an alkaline compound, and the resulting precipitated iron compound separated from the solution and added to the air washing liquid.

8. A process as claimed in claim 1, in which the addition of freshly precipitated iron compound to the air washing liquid is effected continuously or in measured quantities at regular intervals.

9. A process as claimed in claim 1, in which the precipitation of the iron compound for use in eliminating hydrogen sulphide from the air is effected in immediate cooperation with the gas purification process and in which a solution of a ferric compound is added to a feed tank containing an alkaline compound, and the resulting precipitated iron compound separated from the solution and added to the air washing liquid and in which the separation of the freshly precipitated iron compound from the feed tank liquid is effected by settling and decantation, filtration, or the like.

10. A process as claimed in claim 1, in which the washing of the air by the liquid containing freshly precipitated iron compound is effected in a stack.

11. A process as claimed in claim 1, in which aeration of the air washing liquid to precipitate and mechanically float off the sulphur is effected by blowing compressed air through porous material such as porous ceramic material, earthenware, alundum and the like, in contact with the liquid.

12. Apparatus for eliminating hydrogen sulphide from fuel gases comprising in combination, a gas scrubber, an actifier for regenerating by aeration the gas washing liquid, means for circulating the said liquid to and fro between the scrubber and actifier, an air scrubber receiving the fouled air from the actifier, a circulation sump receiving the washing liquid from the air scrubber, means for aerating the liquid in the said sump, and a feed tank for introducing a chemical reagent into the sump.

13. Apparatus as claimed in claim 12, comprising two feed tanks associated with the sump of the air scrubber, one of which tanks is adapted for use as a precipitating tank and is equipped with devices for removing liquid containing inert substances and for adding precipitate to the sump liquid.

14. Apparatus as claimed in claim 12, in which the air scrubber is a stack provided with spaced hurdles or the like.

15. Apparatus as claimed in claim 12, in which the air scrubber sump is equipped with a bed of porous material such as porous ceramic material, earthenware, alundum and other porous material, and means for blowing compressed air through said material into the liquid in the sump.

16. A process for the elimination of hydrogen sulphide from air, characterized by having the carrier air of such volume that the hydrogen sulphide content is not over about 200 grains per 100 cu. ft. of the air, and washing the flowing current of such air with flowing wash-liquor containing a freshly precipitated iron compound having an affinity for sulphur, and effecting by the intimate mutual contact of such flowing air and wash-liquor both the elimination of the hydrogen sulphide and the regeneration of said wash-liquor.

17. A process as claimed in claim 1, in which aeration of the air washing liquid to precipitate and mechanically float off the sulphur is effected by blowing compressed air through porous material, in contact with the liquid.

18. A process for treating a liquid containing iron sulphide in suspension which comprises, introducing finely comminuted air into a body of said liquid, by passing air through porous material submerged in said body of liquid, whereby iron sulphide is oxidized and free sulphur separated by flotation.

19. A process for treating a liquid containing iron sulphide in suspension which comprises, introducing finely comminuted air into a body of said liquid, by passing said liquid over a series of porous members and forcing air through said porous members into the liquid, whereby iron sulphide is oxidized and free sulphur separated by flotation.

20. A process for treating a liquid containing iron sulphide in suspension comprising, passing said liquid over a series of porous members and forcing air through said porous members into said liquid, whereby the air enters the liquid as finely comminuted air and oxidizes the iron sulphide and floats off the sulphur as free sulphur.

21. In the purification of gas, the combination of steps which consists in: causing the hydrogen sulphide to react with a ferric compound contained in a liquid medium, forming a suspension of ferric sulphide, then forcing air through porous material immersed in the suspension, whereby the ferric sulphide is oxidized and free sulphur separated by flotation, removing such floated sulphur and using the liquid containing the ferric compound for the absorption of fresh quantities of hydrogen sulphide.

In testimony whereof I have hereunto set my hand.

FREDERICK W. SPERR, Jr.